United States Patent [19]

Yasukawa et al.

[11] Patent Number: 5,145,891
[45] Date of Patent: Sep. 8, 1992

[54] POLYPROPYLENE RESIN COMPOSITION

[75] Inventors: Yoshiaki Yasukawa; Hiroyoshi Asakuno, both of Ichiharashi; Kinya Mori, Chibashi; Kenji Iwai, Ichiharashi, all of Japan

[73] Assignee: Chisso Corporation, Osaka, Japan

[21] Appl. No.: 236,853

[22] Filed: Aug. 26, 1988

Related U.S. Application Data

[63] Continuation of Ser. No. 939,744, Dec. 9, 1986, abandoned.

[30] Foreign Application Priority Data

Dec. 19, 1985 [JP] Japan ................... 286532
Dec. 19, 1985 [JP] Japan ................... 286533

[51] Int. Cl.$^5$ .............................................. C08K 3/34
[52] U.S. Cl. .................... 524/34; 524/449; 524/451; 524/456; 524/504; 524/505; 525/57; 525/66; 525/68; 525/74; 525/80; 525/92
[58] Field of Search ............ 524/34, 449, 451, 456, 524/504, 505; 525/64, 92, 66, 68, 57, 74, 80

[56] References Cited

U.S. PATENT DOCUMENTS

| | | | |
|---|---|---|---|
| 4,176,097 | 11/1979 | Fox et al. ........................... | 524/451 |
| 4,507,423 | 3/1985 | Sasaki et al. ....................... | 524/451 |
| 4,546,128 | 10/1985 | Nakajima ............................ | 323/222 |
| 4,550,130 | 10/1985 | Kishida et al. ...................... | 524/451 |
| 4,550,144 | 10/1985 | Chiba et al. ........................ | 525/247 |
| 4,603,153 | 7/1986 | Sobajima et al. ................... | 524/456 |
| 4,621,115 | 11/1986 | Morita et al. ...................... | 524/504 |
| 4,720,516 | 1/1988 | Kishida et al. ...................... | 524/451 |

FOREIGN PATENT DOCUMENTS

| | | | |
|---|---|---|---|
| 50058 | 4/1980 | Japan ................................. | 525/64 |
| 15544 | 1/1983 | Japan ................................. | 524/451 |
| 53550 | 3/1985 | Japan . | |
| 248765 | 12/1985 | Japan ................................. | 524/451 |
| 2057458 | 4/1981 | United Kingdom . | |

Primary Examiner—John C. Bleutge
Assistant Examiner—R. Dean
Attorney, Agent, or Firm—Fred Philpitt

[57] ABSTRACT

A polypropylene resin composition superior in rigidity, resistances to heat distortion, to secondary deformation, to sink mark forming and to warpage deformation is provided which comprises a specified propylene-ethylene block copolymer and an organic fiber and an optionally added inorganic filler, or a specified modified propylene-ethylene block copolymer and an organic fiber and an optionary added inorganic filler.

5 Claims, No Drawings

POLYPROPYLENE RESIN COMPOSITION

This is a continuation of application Ser. No. 939,744, filed Dec. 9, 1986, now abandoned.

BACKGROUND OF THE INVENTION

1. Field of the Invention

This invention relates to a polypropylene resin composition. More particularly, it relates to a polypropylene resin composition which is superior in moldability and provides moulded articles having superior rigidity, resistance to heat distortion, resistance to secondary deformation, resistance to sink mark forming and resistance to warpage deformation when the articles are made therefrom.

2. Prior Arts

With regard to the materials for interior automotive trims, appliance parts, parts of office automation machineries, tendency of utilization of plastics is increasing lately, particularly from the viewpoint of their light weight and economical advantage. Among them, polypropylene resin which is superior in moldability, economical condition, appearance and shape, strength, resistance to climate (weatherability) and durability is desirably used.

However, interior automotive trims or appliance parts which are moulded by using conventionally known polypropylene resins have problem in that they have latent residual stress due to inner strain caused during the process of cooling after moulding. On account of this, when an article in which these parts are used, is exposed to the atmosphere at a temperature of 70°-120° C. at the time of practical utilization, release of internal stress occurs, resulting in secondary deformation of the articles to which these parts are attached and losing value as article of commerce. In order to overcome this problem, polypropylene to which an inorganic filler is incorporated, a so-called inorganic-filler-containing polypropylene resin, is abundantly used. However, if such an inorganic filler-containing polypropylene resin is used, the secondary deformation of moulded articles may be improved but drawbacks are accompanied: The surfaces of moulded articles become liable to be injured by foreign materials and moreover, the injuries whiten and surface appearance is spoiled. Further impact strength is also lowered.

We, the inventors of this invention have made strenuous effort in study to improve the drawbacks of the above-mentioned polypropylene resin composition i.e. the problem of liability of causing secondary deformation. As the result, to be astonishing enough, we have found that a composition formed by blending a predetermined amount of organic fibers with a propylene-ethylene block copolymer having a 3-16% by weight of ethylene content based on the entire copolymer (hereinafter referred to as a specified P-E block copolymer), obtained by polymerizing in the first polymerization stage to give 70-95% by weight of propylene homopolymer (based on the entire copolymer) having a relation between isotactic pentad ratio (P) and melt flow rate (MFR) of $1.00 \geq P \geq 0.015 \log MFR + 0.955$, and then polymerizing in the subsequent one or more stage to give 30-5% by weight of propylene-ethylene copolymer (based on the entire copolymer), or modified propylene-ethylene block copolymer formed by modifying the specified P-E block copolymer by an unsaturated carboxylic acid or its derivative (hereinafter referred to as specified modified P-E block copolymer), or a composition formed by blending a predetermined amount of organic fibers and an inorganic filler with a specified P-E block copolymer, a specified modified P-E block copolymer, or a mixture of the specified P-E block copolymer and the specified modified P-E block copolymer, has good moldability, and provides moulded articles having good rigidity, resistances to heat distortion to secondary deformation, to sink mark forming and to warpage deformation when it is made into moulded articles and we have completed the present invention based on these findings.

As evident from the foregoing description, the object of the present invention is to provide a polypropylene resin composition having a good moldability, which can produce moulded articles superior in rigidity, resistances to heat-distortion, to secondary deformation, to sink mark forming, and to warpage deformation when it is made into moulded articles.

SUMMARY OF THE INVENTION

The present invention has a following constitution:

1. A polypropylene resin composition comprising a blend of
   (i) a propylene-ethylene block copolymer having a 3-16% by weight of ethylene content based on the entire copolymer, obtained by polymerizing in the first polymerization stage to give 70-95% by weight of propylene homopolymer (based on the entire copolymer) having a relation between isotactic pentad ratio (P) and melt flow rate (MFR) of $1.00 \geq P \geq 0.015 \log MFR + 0.955$, and then polymerizing in the subsequent one or more stage to give 30-5% by weight of propylene-ethylene copolymer (based on the entire copolymer), and
   (ii) 20-50% by weight of an organic fiber based on the resin composition.

2. A polypropylene resin composition comprising a bland of
   block copolymer and
   (ii) 20-50% by weight of an organic fiber based on the resin composition.

3. A polypropylene resin composition formed by blending 20-50% by weight of organic fibers with a modified propylene-ethylene block copolymer obtained in the first polymerization step to give 70-95% by weight of propylene homopolymer (based upon the total polymerization amount) having a relation between isotactic pentad ratio (P) and melt flow rate (MFR) of $1.00 \geq P \geq 0.015 \log MFR + 0.955$ and then in the subsequent one or more polymerization step to give 30-5% by weight (based upon the total polymerization amount) of ethylene and propylene, having 3-16% by weight of ethylene content based upon the entire copolymer and to modify the resultant polymer with an unsaturated carboxylic acid or its derivative.

4. A polypropylene resin composition comprising a blend of
   (i) a modified propylene-ethylene block copolymer, obtained by modifying a specified P-E block copolymer with an unsaturated carboxylic acid or its derivative, and
   (ii) 20-50% by weight of an organic fiber and 5-30% by weight of an inorganic filler based on the resin composition.

DETAILED DESCRIPTION OF THE INVENTION

The propylene-ethylene block copolymer used in the present invention is the one having a specified composition and physical properties (hereinafter referred to as a specified P-E block copolymer).

An ordinary propylene-ethylene block copolymer (hereinafter referred to as an ordinary P-E block copolymer) is produced according to a polymerization process including two or more polymerization steps having each of propylene homopolymer portion and ethylene homopolymer portion or ethylene-propylene copolymer portion. It is superior in impact resistance to propylene-homopolymer but on the other hand, it has a drawback of slightly lower heat-distortion temperature than the said homopolymer. However, the specified P-E block copolymer is one kind of high rigidity polypropylene in which a propylene homopolymer portion occupying 70-95% by weight of the total has a relation of isotactic pentad ratio (P) to melt flow rate (MFR) of $1.00 \geq P \geq 0.015 \log MFR + 0.955$ and the ethylene content occupying in the ethylene, propylene copolymer is limited to 3-16% by weight based upon the total amount of polymer.

Such a copolymer and its production method is disclosed e.g. in the official gazette of Japanese unexamined patent application No. 201816 of 1983.

Namely, a propylene ethylene block copolymer useful for high rigidity moulded articles which is characterized in (1) polymerizing 70-95% by weight of the total polymerization amount, of propylene, then (2) polymerizing 30-5% by weight of the total polymerization amount, of ethylene or ethylene and propylene in one or more step to give 3-20% by weight of ethylene content, in the presence of a catalyst obtained by reacting an organoaluminum compound (1) or a reaction product (VI) of an organoaluminum compound (1) with an electron donor (A), with titanium tetrachloride (C) to give a solid product (II), to which an electron donor (A) and an electron acceptor (B) are reacted to give a solid product (III) which is combined with an organoaluminum compound (IV) and an aromatic carboxylic acid ester so as to make the mol ratio (V)/(III) of the said aromatic carboxylic acid ester to the said solid product (III) fall in the range of 0.1-10.0 and its production method are also disclosed therein.

The specified modified P-E block copolymer useful in the present invention can be obtained according to a known method by reacting the above-mentioned specified P-E block copolymer with an unsaturated carboxylic acid or its derivative in a solvent or in the melted state.

As an unsaturated carboxylic acid or its derivative, acrylic acid, methacrylic acid, maleic acid, itaconic acid, fumaric acid, citraconic acid, esters of these acids, maleic anhydride, citraconic anhydride, itaconic anhydride, etc. are illustrated. Particularly, it is preferable to use maleic anhydride or a glycidylester of methacrylic acid.

The amount of use of the unsaturated carboxylic acid or its derivative s in the range of 0.05-15% by weight, preferably 0.05-10% by weight, most preferably 0.05-5% by weight relative to the specified propylene-ethylene block copolymer.

As for organic fibers useful in the present invention, there is no special limitation except that those which do not decompose, or melt at the time of melting and kneading, are used. For example, polyamide type fibers, polyester type fibers, polyimido fibers, polyvinyl alcohol type fibers, polyvinylidene type fibers, super high strength polyethylene fibers polyacrylonitrile type fibers, polyurethane type fibers, polyalkylene paraoxybenzoate type fibers, carbon fibers, phenol type fibers, rayon fibers, acetate fibers, cotton fibers, flax fibers, ramie fibers, jute fibers, wool fibers, silk fibers, a mixture of two or more of these fibers can be used. Particularly, preferable is polyamide type fibers, polyester type fibers, cotton fibers and a mixture of the above-mentioned fibers. As for the shape of the organic fibers, there is no particular limitation. Any of those having thread shape, woven or knitted material shape, non-woven fiber shape can be useful. It is preferable for those having woven or knitted shape and non-woven fiber shape, to be used after separating into monofilaments in advance. Further as for the length of the organic fibers used, it is preferable to use at the length cut to 1-50 mm, more preferable 1-30 mm. Those having a length of 1-10 mm are most preferable. As for the thickness of the organic fibers used, 0.5-20 denier fibers are preferable, 1-10 denier fibers are more preferable and 1-5 denier fibers are most preferable.

The amount of organic fibers to be blended is 20-50% by weight. More preferably, it is 30-50% by weight. If the amount to be blended is less than 20% by weight, it is not preferable because rigidity and resistance to secondary deformation are lowered. It does not matter even if it is over 50% by weight, but the improvement of rigidity and resistance to secondary deformation over that of 50% is not recognized. It is not preferable because fluidity of molten resin is lowered and moldability is lowered.

The inorganic fillers used in the present invention, are powdery inorganic fillers. For example, talc, calcium carbonate, calcium hydroxide, mica, barium sulfate, calcium silicate, clay, silica, alumina wollastonite, magnesium carbonate, magnesium hydroxide, iron oxide, zinc oxide, titanium oxide, gypsum powder, a mixture of two or more of these can be mentioned. Particularly, talc is preferable.

The amount of the inorganic filler to be blended varies according to the degree of improvement of rigidity and resistance to heat distortion required for the moulded articles but it is usually 5-30% by weight and most preferably 10-20% by weight. If the amount of the inorganic filler to be blended is less than 5% by weight, the effectiveness of blending of an inorganic filler is not exhibited. If it is over 30% by weight, rigidity and resistance to heat distortion are improved but it is not preferable because impact strength is lowered.

Various kinds of additives which are added to an ordinary polypropylene resin in case of necessity, such as antioxidant, antistatic agent, ultraviolet absorber, anti-copper agent, colorant, can be used as the occasion may demand, at the same time.

The production of the composition of the present invention is carried out e.g. by feeding each various predetermined a amount of pellets of specified P-E block copolymer or pellets of specified modified P-E block copolymer, an organic fiber, an inorganic filler to a Henschel mixer (trade name), a super mixer or the like, followed by heating at a temperature of 170°-230° C. with stirring and kneading or by melting and kneading, a predetermined amount of the above-mentioned blending components in a banbury mixer, a roll, a single screw or twin screw extruder or co-kneader to pelletize them.

In the production of the composition of the present invention, it is necessary to do heating, and kneading or melting, and kneading in such a way that the above-mentioned organic fibers blended at the time of heating with stirring and kneading or melting and kneading, do not melt or decompose, namely, the original shape as fibers are maintained. For that purpose, as temperature for heating with stirring, and kneading, a temperature of 170°–230° C. is preferable, 180°–200° C. is more preferable and 180°–190° C. is particularly preferable. At the time of moulding the composition of the present invention by various moulding processes, it is necessary to pay attention to select condition that the organic fiber to be blended, does not melt or decompose. For that purpose, a moulding temperature at 230° C. or lower is preferable.

The polypropylene resin composition of the present invention can be used in the production of various kinds of moulded articles by injection moulding process, extrusion moulding process and so on.

The moulded articles made by using the polypropylene resin composition of the present invention, are excellent in rigidity, resistance to heat distortion, resistance to secondary deformation, resistance to sink mark forming and resistance to warpage deformation as compared with moulded articles made by using a composition in which an ordinary polypropylene resin or an orginary modified polypropylene resin or a mixture of these materials is blended with an organic fiber and/or an inorganic filler, and can be used suitably in the field of various kinds of articles such as interior automotive trims, appliance parts, parts of office automation machineries.

The present invention will be more fully explained by way of specific examples and comparative examples. The evaluation methods used in the specific examples and comparative examples are those described below.

1) Rigidity: flexural moduli at a temperature of 23° C. and 80° C. are measured (according to JIS K 7203). As rigidity ratio, flexural modulus flexural modulus at 23° C. / flexural modulus at 80° C. is also calculated.

2) Bending strength; measurement is made according to JIS K 7203.

3) Tensile strength; measurement is made according to JIS K 7113.

4) Resistance to heat distortion: Heat distortion temperature under a load of 18.5 Kgf/cm$^2$ is measured according to JIS K 7207.

5) Secondary deformation:

Flat plates having a length of 400 mm, a width of 80 mm and a thickness of 3 mm are molded and used as test pieces. The test piece is fixed to an iron jig with wet screws at two points, each 50 mm apart from the left and right ends of the long sides, placed in an oven at 80° C. and left to stand for 2 hours. Afterward it is taken out of the oven and a maximum clearance between the test piece and the jig is measured immediately and recorded as amount of deformation A. Then after allowing to stand at room temperature for 24 hours under the state of the test piece fixed to the jig, a maximum clearance between the test piece and the jig is measured and recorded as amount of deformation B. Further the test piece is removed from the jig and left to stand on the jig and a maximum clearance between the test piece and the jig is measured and recorded as amount of deformation C (unit is mm).

It means that the smaller the amount of secondary deformation, the better the resistance to secondary deformation.

6) Measurement of sink mark:

A test piece having a shape of ⊥ formed by erecting a rib having a thickness of 3 mm and a height of 5 mm in the direction perpendicular to a flat plate (90 mm long, 90 mm wide and 2 mm thick) is molded by injection molding process at a resin temperature of 200° C. and the flat plate of the opposite side of the rib fixed side was observed with naked eyes and the state of forming of sink marks was judged according to the following standard.

o: sink marks are not recognizable and surface state is good x: sink marks are notable and surface state is not good 7) Measurement of warpage deformation A flat plate having a length of 400 mm, a width of 80 mm and a thickness of 3 mm is molded at a condition of resin temperature of 200° C. according to injection molding process and used as a test piece. After the test piece is left to stand under the condition of temperature 23° C. and relative humidity of 50% for 48 hours, the test piece is placed on a horizontal metal plate. When a 1 Kg metal weight having a cylindrical shape of 70 mm in diameter and 30 mm in height is placed on one end of the test piece, the clearance between the other end of the test piece and the horizontal metal plate is measured and recorded as unit of mm of amount of warpage deformation.

SPECIFIC EXAMPLES 1-5, AND COMPARATIVE EXAMPLES 1-7

In specific examples 1-5, pellets of a specified P-E block copolymer having a melt flow rate (MFR) of 15 g/10 min. an isotactic pentad ratio (P) of 0.98 and an ethylene content of 8.5% by weight, and as an organic fibers, an organic fiber having a thickness of 1.5 denier and a fiber length of 3 mm, made by cutting and disintegrating mixed-spun woven material consisting of 65% by weight of polyester and 35% by weight of cotton and further in case of examples 2-3, as an inorganic filler talc having an average particle diameter of 2 μ were charged to a Henschel mixer in a ratio of blending components described in the Table 1 below and subjected to heating with stirring, mixing and kneading at a temperature of 180° C. for 10 minutes to obtain pellet-form composition.

As for comparative examples 1-2, in comparative example 1 glass fibers having an average diameter of 15 μ, and an average length of 3 mm were blended with a specified P-E block copolymer the same as those used in examples 1-5 in the blending proportion described in Table 1 below and mixed with stirring for 10 minutes in a tumbler mixer and in comparative example 2, a talc having an average particle diameter of 2 μ was blended with a specified P-E block copolymer the same as those used in examples 1-5 in the blending proportion described in Table 1 below and mixed with stirring for 10 minutes in a Henschel mixer without heating and each resulting mixture was extruded through a single screw extruder having a diameter of 65 mm at a temperature of 250° C. of melting and kneading to produce pellets.

COMPARATIVE EXAMPLES 3 TO 4

In comparative example 3, pellets of an ordinary P-E block copolymer (30 g/10 min. of MFR, P=0.93, ethylene content 8.5% by weight) were blended with the same glass fiber as used in comparative example 1 at a blending ratio described in Table 1 below, and according to the procedure of comparative example 1, they were stirred and mixed, and melted, kneaded and extruded into pellets.

In comparative example 4, an ordinary P-E block copolymer as used in example 3 was blended with the same talc as used in comparative example 2 at a blending ratio described in Table 1 below, and according to comparative example 2, they were stirred and mixed, and melted, kneaded and extruded into pellets.

COMPARATIVE EXAMPLES 5 TO 7

An ordinary P-E block copolymer as used in comparative examples 3 to 4 was blended with the same organic fiber as used in example 1 and 5, provided that talc was further added in comparative example 7, at a blending ratio described in Table 1 below, and according to the procedure of examples 1 to 5, they were heated, stirred, and kneaded to obtain a pellet composition.

By using the pellets obtained in each examples and comparative examples 5-7, various kinds of test pieces of predetermined shape were made by injection molding process at a resin temperature of 200° C.

By using the pellets obtained in comparative example 1-4, various kinds of test pieces of predetermined shape were made by injection molding process at a resin temperature of 230° C.

With regard to the prepared test pieces, flexural moduli at 23° C. and 80° C., heat distortion temperature under a load of 18.5 Kgf/cm$^2$, secondary deformation, sink marks and warpage deformation were measured.

The results of these tests are summarized in Table 1.

EXAMPLES 6-7 AND COMPARATIVE EXAMPLES 8-9

For examples 6-7, heating with stirring and kneading were carried out according to the process of example 2 in example 6 and according to the process of example 4 in example 7 to obtain pellet-form composition except that nylon 66 fibers having a thickness of 1.5 denier and a length of 3 mm were used as organic fibers.

For comparative examples 8-9, heating with stirring and kneading were carried out according to the process of example 2 in comparative example 8 and according to the process of example 4 in comparative example 9 to obtain pellet form composition except that an ordinary P-E block copolymer was used.

By using the pellets obtained in each examples and each comparative examples, and according to the process of examples 2 and 4, various kinds of test pieces were prepared and flexural moduli at 23° C. and 80° C., heat distortion temperature under a load of 18.5 Kgf/cm$^2$, secondary deformation, sink marks, and warpage deformation were measured. The results of these tests are summarized in Table 1.

EXAMPLES 8-15 AND COMPARATIVE EXAMPLES 10-17

As examples 8-15, a specified P-E block copolymer having a melt flow rate (MFR) of 15 g/10 min. isotactic pentad ratio (P) of 0.98, and ethylene content of 8.5% and maleic anhydride (0.4% by weight) were melted, kneaded and extruded in the presence of an organic peroxide to obtain pellets. Resulting specified modified P-E block copolymer pellets, organic fibers having a length of 3 mm formed by cutting and disintegrating mixed-spun woven material consisting of 65% by weight of polyester and 35% by weight of cotton, as organic fibers, were blended and in examples 11-12, talc having an average particle diameter of 2 $\mu$, as an inorganic filler were further blended in the blending proportions described in Table 2 hereinafter described and melted with stirring and kneading in a Henschel mixer at 200° C. for 10 minutes to give pellet-form composition.

As for comparative examples 10-15, in comparative example 10, glass fibers having an average diameter of 5 $\mu$ and average length of 3 mm was blended with pellets of a specified modified P-E block copolymer, the same with those used in examples 8-12, in the blending proportions described in Table 2 and mixed with stirring for 10 minutes in a tumbler. In comparative example 11, talc having an average particle diameter of 2 $\mu$ was blended with pellets of the specified modified P-E block copolymer, the same with those used in examples 8-12 in the blending proportions described hereinafter in Table 2 and mixed with stirring for 10 minutes without heating in particular in a Henschel mixer. Each resulting mixture was melted, kneaded at a temperature of 250° C. with a single screw extruder having a diameter of 65 mm to obtain pellets. Further in comparative examples 12-15, to an ordinary modified propylene-ethylene block copolymer obtained by melting, kneading and extrusion of an ordinary P-E block copolymer having a MFR 30 g/10 min. P=0.93 and an ethylene content of 8.5% by weight, with 0.4% by weight of maleic anhydride in the presence of an organic peroxide, an organic fiber the same with those used in examples 8-12 was blended and in comparative examples 14-15, talc having an average particle diameter of 2 $\mu$ was further added in the blending proportion described hereinafter in Table 2 and was heated with stirring and kneaded in a Henschel mixer according to the process of examples 8-12 to obtain pellet-form composition.

By using the pellets obtained in each examples and comparative examples 12-15, various kinds of test pieces of predetermined shape were molded by injection molding process at a resin temperature of 200° C. By using the pellets obtained in each examples and in comparative examples 10-11, various kinds of test pieces of predetermined shape were molded by injection molding process at a temperature of 230° C.

With regard to the molded test pieces, flexural moduli at 23° C. and 80° C., rigidity ratio, bending strength, tensile strength, heat distortion temperature under a load of 18.5 Kgf/cm$^2$, secondary deformation, sink marks, and warpage deformation were measured. The results of these tests are indicated and summarized in Table 2.

EXAMPLES 13-15 AND COMPARATIVE EXAMPLES 16-17

As for examples 13-15, pellets of a specified modified P-E block copolymer the same with those used in examples 8-12, pellets of a specified P-E block copolymer having a MFR of 15 g/10 minutes, isotactic pentad ratio (P) of 0.98 and ethylene content of 8.5% by weight, which was the raw material resin of the said specified modified P-E block copolymer and in example 13, the same organic fibers as used in examples 8-12, and the same organic fibers and talc as used in examples 11-12 in examples 14-15 were introduced into a Henschel mixer in the blending proportion described hereinafter described in Table 2 and heated with stirring and kneaded according to the process of example 8-12 to obtain pellet-form composition.

Further as for comparative examples 16-17, pellets of an ordinary modified propylene-ethylene block copolymer the same with those used in comparative examples 12-15, pellets of an ordinary P-E block copolymer having MFR 30 g/10 min., P=0.93 and ethylene content of 8.5% by weight, which was a raw material resin of the above-mentioned ordinary modified propylene-ethylene block copolymer and an organic fibers the same with those in examples 8-12, in comparative example 16 and the organic fibers and talc in comparative example 17 were charged into a Henschel mixer in the blending proportion described hereinafter in Table 2 and pellet-form composition was obtained by heating with stirring and kneading according to the process of examples 8-12.

By using the pellets obtained in each examples and each comparative examples, various kinds of test pieces of predetermined shape were prepared according to the process of examples 8-12 and with regard to the test pieces, flexural moduli at 23° C. and 80° C., rigidity ratio, bending strength, tensile strength, heat distortion temperature under a load of 18.5 Kgf/cm$^2$, secondary deformation, sink marks, warpage deformation were measured. The results of these tests are shown in Table 2.

EXAMPLES 16-17 AND COMPARATIVE EXAMPLES 18-19

As for examples 16-17, pellet-form compositions were obtained by heating with stirring and kneading according to the process of example 9 in example 16 and according to the process of example 11 in example 17 except that nylon 66 fibers having a thickness of 1.5 denier and a length of 3 mm were used as organic fibers.

Further as for comparative examples 18-19, pellet-form compositions were obtained by heating with stirring and kneading according to the process of example 9 in comparative example 18, and according to the process of example 11 in comparative example 19.

By using the pellets obtained in each examples and each comparative examples, various kinds of test pieces of predetermined shape were prepared according to the process of example 8-12 and with regard to the test pieces, flexural moduli at 23° C. and 80° C., rigidity ratio, bending strength, tensile strength, heat distortion temperature under a load of 18.5 Kgf/cm$^2$, secondary deformation, sink marks and warpage deformation were measured. The results of these tests are shown in Table 2.

TABLE 1

| | Examples | | | | | | | Comparative Examples | |
|---|---|---|---|---|---|---|---|---|---|
| | 1 | 2 | 3 | 4 | 5 | 6 | 7 | 1 | 2 |
| A specified P-E block copolymer | 80 | 60 | 50 | 60 | 50 | 60 | 60 | 80 | 70 |
| An ordinary P-E block copolymer | — | — | — | — | — | — | — | — | — |
| Organic fibers | 20 | 30 | 20 | 40 | 50 | 30* | 40* | — | — |
| Talc | — | 10 | 30 | — | — | 10 | — | — | 30 |
| Glass fibers | — | — | — | — | — | — | — | 20 | — |
| Flexural modulus at 23° C. (Kgf/cm$^2$) | 21000 | 30500 | 36000 | 28000 | 32000 | 29500 | 27500 | 39000 | 30000 |
| Flexural modulus at 80° C. (Kgf/cm$^2$) | 7500 | 12500 | 14000 | 11000 | 12000 | 12000 | 10000 | 21000 | 9000 |
| Heat distortion temperature (°C.) under a load of 18.5 Kgf/cm$^2$ | 85 | 93 | 95 | 91 | 92 | 93 | 90 | 140 | 82 |
| Secondary deformation A (mm) | 7.2 | 5.0 | 4.6 | 4.9 | 4.5 | 5.1 | 5.1 | 4.1 | 7.6 |
| Secondary deformation B (mm) | 2.4 | 1.7 | 1.5 | 1.5 | 1.4 | 1.6 | 1.5 | 1.3 | 2.5 |
| Secondary deformation C (mm) | 3.0 | 1.9 | 1.7 | 1.7 | 1.7 | 1.7 | 1.7 | 30 | 3.4 |
| Warpage deformation (mm) | 2.5 | 2.9 | 2.6 | 3.0 | 2.9 | 2.8 | 2.6 | 65 | 4.8 |
| Sink marks | o | o | o | o | o | o | o | o | x |

| | Comparative Examples | | | | | | |
|---|---|---|---|---|---|---|---|
| | 3 | 4 | 5 | 6 | 7 | 8 | 9 |
| A specified P-E block copolymer | — | — | — | — | — | — | — |
| An ordinary P-E block copolymer | 80 | 70 | 80 | 70 | 60 | 60 | 60 |
| Organic fibers | — | — | 20 | 30 | 30 | 30* | 40* |
| Talc | — | 30 | — | — | 10 | 10 | — |
| Glass fibers | 20 | — | — | — | — | — | — |
| Flexural modulus at 23° C. (Kgf/cm$^2$) | 34000 | 25000 | 16000 | 20000 | 25000 | 24500 | 22000 |
| Flexural modulus at 80° C. (Kgf/cm$^2$) | 19000 | 6500 | 6000 | 7500 | 8000 | 7500 | 7000 |
| Heat distortion temperature (°C.) under a load of 18.5 Kgf/cm$^2$ | 135 | 76 | 76 | 80 | 82 | 80 | 80 |
| Secondary deformation A (mm) | 4.5 | 8.3 | 8.0 | 7.5 | 7.0 | 7.2 | 7.2 |
| Secondary deformation B (mm) | 1.5 | 2.9 | 2.7 | 2.5 | 2.3 | 2.3 | 2.6 |
| Secondary deformation C (mm) | 35 | 4.0 | 4.0 | 3.6 | 3.1 | 2.9 | 3.0 |
| Warpage deformation (mm) | 78 | 5.5 | 3.5 | 4.3 | 3.5 | 3.4 | 3.6 |
| Sink marks | o | x | o | o | o | o | o |

*Nylon 66 fibers of 1.5 denier in thickness and 3 mm in length are used as organic fibers.

TABLE 2

| | | Examples | | | | | | | | | |
|---|---|---|---|---|---|---|---|---|---|---|---|
| | | 8 | 9 | 10 | 11 | 12 | 13 | 14 | 15 | 16 | 17 |
| Blending proportion (% by weight) | A specified modified P-E block copolymer | 80 | 70 | 50 | 60 | 50 | 50 | 35 | 40 | 70 | 60 |
| | A specified P-E block copolymer | — | — | — | — | — | 20 | 35 | 10 | — | — |
| | Ordinary modified P-E block copolymer | — | — | — | — | — | — | — | — | — | — |
| | Ordinary P-E block copolymer | — | — | — | — | — | — | — | — | — | — |
| | Organic fibers | 20 | 30 | 50 | 30 | 20 | 30 | 20 | 20 | 30* | 30* |

TABLE 2-continued

|  | | | | | | | | | | |
|---|---|---|---|---|---|---|---|---|---|---|
| Talc | — | — | — | 10 | 30 | — | 10 | 30 | — | 10 |
| Glass fibers | — | — | — | — | — | — | — | — | — | — |
| Flexural modulus at 23° C. (Kgf/cm$^2$) | 20500 | 24000 | 31000 | 29500 | 37000 | 24500 | 25000 | 37000 | 23500 | 29000 |
| Flexural modulus at 80° C. (Kgf/cm$^2$) | 7000 | 10500 | 11500 | 12000 | 13500 | 10500 | 8500 | 13500 | 10000 | 11500 |
| Rigidity ratio | 0.34 | 0.44 | 0.37 | 0.41 | 0.37 | 0.43 | 0.34 | 0.37 | 0.43 | 0.40 |
| Bending strength (Kgf/cm$^2$) | 560 | 580 | 550 | 600 | 620 | 550 | 500 | 600 | 600 | 610 |
| Tensile strength (Kgf/cm$^2$) | 420 | 450 | 430 | 450 | 470 | 420 | 370 | 450 | 460 | 470 |
| Heat distortion temperature (°C.) under a load of 18.5 Kgf/cm$^2$ | 87 | 93 | 94 | 98 | 100 | 94 | 90 | 100 | 91 | 96 |
| Secondary deformation A (mm) | 7.3 | 6.5 | 4.7 | 5.4 | 4.5 | 6.8 | 6.8 | 4.5 | 6.6 | 5.6 |
| Secondary deformation B (mm) | 2.3 | 2.0 | 1.2 | 1.7 | 1.8 | 2.2 | 2.3 | 1.8 | 2.1 | 1.7 |
| Secondary deformation C (mm) | 2.8 | 3.0 | 1.5 | 1.8 | 1.7 | 3.1 | 3.4 | 1.7 | 2.7 | 1.7 |
| Warpage deformation (mm) | 2.6 | 2.8 | 3.2 | 2.8 | 3.0 | 3.0 | 3.2 | 3.0 | 2.9 | 3.0 |
| Sink marks | o | o | o | o | o | o | o | o | o | o |

| | | Comparative Examples | | | | | | | | | |
|---|---|---|---|---|---|---|---|---|---|---|---|
| | | 10 | 11 | 12 | 13 | 14 | 15 | 16 | 17 | 18 | 19 |
| Blending proportion (% by weight) | A specified modified P-E block copolymer | 70 | 70 | — | — | — | — | — | — | — | — |
| | A specified P-E block copolymer | — | — | — | — | — | — | — | — | — | — |
| | Ordinary modified P-E block copolymer | — | — | 80 | 70 | 70 | 50 | 50 | 40 | 70 | 60 |
| | Ordinary P-E block copolymer | — | — | — | — | — | — | 20 | 10 | — | — |
| | Organic fibers | — | — | 20 | 30 | 20 | 20 | 30 | 20 | 30* | 30* |
| | Talc | — | 30 | — | — | 10 | 30 | — | 30 | — | 10 |
| | Glass fibers | 30 | — | — | — | — | — | — | — | — | — |
| Flexural modulus at 23° C. (Kgf/cm$^2$) | | 49000 | 29000 | 15000 | 19000 | 18000 | 31000 | 26500 | 30000 | 18500 | 22000 |
| Flexural modulus at 80° C. (Kgf/cm$^2$) | | 32000 | 9000 | 6000 | 7500 | 5000 | 6000 | 5000 | 5500 | 7000 | 7500 |
| Rigidity ratio | | 0.65 | 0.31 | 0.40 | 0.40 | 0.28 | 0.19 | 0.19 | 0.18 | 0.38 | 0.34 |
| Bending strength (Kgf/cm$^2$) | | 950 | 390 | 370 | 400 | 390 | 430 | 360 | 420 | 390 | 410 |
| Tensile strength (Kgf/cm$^2$) | | 980 | 300 | 290 | 350 | 280 | 330 | 250 | 310 | 340 | 360 |
| Heat distortion temperature (°C.) under a load of 18.5 Kgf/cm$^2$ | | 158 | 84 | 79 | 84 | 80 | 85 | 85 | 86 | 83 | 86 |
| Secondary deformation A (mm) | | 4.0 | 7.2 | 7.8 | 7.4 | 7.6 | 5.7 | 7.6 | 5.9 | 7.2 | 6.8 |
| Secondary deformation B (mm) | | 1.1 | 2.1 | 2.5 | 2.3 | 2.5 | 2.0 | 2.5 | 2.7 | 2.3 | 2.5 |
| Secondary deformation C (mm) | | 25 | 3.1 | 3.3 | 3.5 | 3.5 | 3.0 | 3.7 | 3.4 | 3.4 | 3.3 |
| Warpage deformation (mm) | | 49 | 4.0 | 2.6 | 2.9 | 4.0 | 3.7 | 4.0 | 3.9 | 3.2 | 3.0 |
| Sink marks | | o | x | o | o | o | o | o | o | o | o |

*Nylon 66 fibers having a thickness of 1.5 denier and a length of 3 mm were used as organic fibers.

As evident from Table 1, the moulded articles obtained in each examples in which the compositions of the present invention were used, are superior in rigidity (flexural modulus ) resistances to heat deformation, to secondary deformation, to sink mark forming, and to warpage deformation. In contrast, the moulded articles obtained in comparative example 1 in which glass fibers but not organic fibers, were blended with a specified P-E block copolymer and comparative example 3 in which glass fibers were blended with an ordinary P-E block copolymer are superior in rigidity, resistance to heat deformation, resistance to sink mark forming but extremely inferior in resistance to secondary deformation, and to warpage deformation, and the moulded articles obtained in comparative example 2 in which talc was blended with a specified P-E block copolymer and the moulded articles obtained in comparative example 4 in which talc was blended with an ordinary P-E block copolymer were inferior in resistances to heat distortion, to secondary deformation, to sink mark forming and to warpage deformation and thus it is understandable that there is a problem in the practical use of these materials.

Further the moulded articles obtained in comparative examples 5-6 in which organic fibers are blended with an ordinary P-E block copolymer is inferior to those obtained in each examples in rigidity (flexural modulus), resistances to heat distortion, to secondary deformation, and to warpage deformation the moulded articles obtained in comparative example 7 in which organic fibers and talc are blended with an ordinary P-E block copolymer are extremely inferior to the moulded article obtained in example 2 in rigidity (flexural modulus), resistances to heat distortion, to secondary deformation and to warpage deformation and thus it is understandable that there are problem in practical use.

Further, it has been revealed that in case of the use of nylon 66 fibers as organic fibers, the same results as those above-mentioned are obtained.

As evident from Table 2, it is understandable that the moulded articles obtained in each examples in which the composition of the present invention is used, are superior in rigidity (flexural modulus) bending strength, tensile strength, resistances to heat distortion, to secondary deformation, to sink mark forming, and to warpage deformation.

In contrast, the moulded articles obtained in comparative example 10 in which glass fibers are blended in place of organic fibers, are superior in rigidity, bending strength, tensile strength, resistance to heat distortion but extremely inferior in resistances to secondary deformation and to warpage deformation. The moulded articles obtained in comparative example 11 in which only talc is blended, are inferior in resistances to heat distortion, to secondary deformation, to sink mark forming and to warpage deformation. Thus it is understandable that there is problem in practical use. It is seen that the moulded articles obtained in comparative examples 12-13 in which organic fibers are blended with an ordinary modified P-E block copolymer are inferior in rigidity (bending modulus) and resistance to heat distortion and the moulded articles obtained in comparative examples 14-15 in which organic fibers and talc are blended with an ordinary modified P-E block copolymer are low in rigidity ratio and inferior in resistances to heat distortion, to secondary deformation and to warpage deformation.

Further it is understandable that the moulded articles obtained in comparative example 16 in which organic fibers are blended and example 17 in which talc is further blended therein with a mixture of an ordinary modified P-E block copolymer and an ordinary P-E block copolymer are lower in rigidity at higher temperature and inferior in bending strength, tensile strength resistances to heat distortion, to secondary deformation and to warpage deformation, and thus not preferable in practical use.

Further it has been revealed that the case of the use of Nylon 66 fibers as organic fibers provides the same result as the above-mentioned case.

As detailed above, the shaped articles molded by using the composition of the present invention are extremely superior in rigidity, resistances to heat distortion, to secondary deformation, to sink mark forming and to warpage deformation and thus it has been revealed that they are suitably used in interior automotive trims, appliance parts, parts of office automation machineries.

What is claimed is:

1. A polypropylene resin composition consisting essentially of a blend of
   (i) a modified propylene-ethylene block copolymer, obtained by modifying the specified P-E block copolymer having a 3–16% by weight of ethylene content based on the entire block copolymer, with an unsaturated carboxylic acid selected from the group consisting of acrylic acid, methacrylic acid, maleic acid, itaconic acid, fumaric acid, citraconic acid, or an unsaturated carboxylic acid derivative selected from the group consisting of an ester of foregoing acids, maleic anhydride, citraconic anhydride and itaconic anhydride, said specified P-E block copolymer being obtained by polymerizing in a first polymerization stage to give 70–95% by weight of propylene homopolymer and having the relation between isotactic pentad ratio (P) and melt flow rate (MFR) of $1.00 \geq P \geq 0.015 \log MFR + 0.955$, and then further polymerizing in at least one subsequent stage to obtain 30–5% by weight of propylene-ethylene copolymer (based on the entire copolymer), and
   (ii) 20–50% by weight based on the resin composition of an organic fiber selected from the group consisting of aliphatic polyamide fibers, polyester fibers, polyvinyl alcohol fibers, polyimide fibers, polyvinylidene-chloride fibers polyacrylontrile fibers, polyurethane fibers, polyethylene fibers, alkylene paraoxybenzoate fibers phenol fibers, rayon fibers, acetate fibers, cotton fibers, flax fibers, ramie fibers, jute fibers, wool fibers, silk fibers, and a mixture of at least two of foregoing fibers, and
   (iii) 5–50% by weight (based on the weight of the resin composition of an inorganic filler selected from the group consisting of talc, mica, wollastonite and a mixture of at least two of the foregoing members.

2. A polypropylene resin composition consisting essentially of a blend of
   (i) a modified propylene-ethylene block copolymer, obtained by modifying the specified P-E block copolymer having a 3–16% by weight of ethylene content based on the entire block copolymer, with an unsaturated carboxylic acid selected from the group consisting of acrylic acid, methacrylic acid, maleic acid, itaconic acid, fumaric acid and citraconic acid or with an unsaturated carboxylic acid derivative selected from the group consisting of esters of the foregoing acids, maleic anhydride, citraconic anhydride and itaconic anhydride, said specified P-E block copolymer being obtained by polymerizing in a first polymerization stage to give 70–95% by weight of propylene homopolymer (based on the entire copolymer) and having the relation between isotactic pentad ratio (P) and melt flow rate (MFR) of $1.00 \geq P \geq 0.015 \log MFR + 0.955$, and then further polymerizing in at least one subsequent stage to obtain 30–5% by weight of propylene-ethylene copolymer (based on the entire copolymer), and
   (ii) 20–50% by weight based on the resin composition of an organic fiber selected from the group consisting of aliphatic polyamide fibers, polyester fibers, polyvinyl alcohol fibers, polyimide fibers, polyester fibers, polyvinyl alcohol fibers, polyimide fibers, polyvinylidenechloride fibers, polyacrylonitrile fibers, polyurethane fibers, polyethylene fibers, alkyleneparaoxybenzoate fibers, phenol fibers, rayon fibers, acetate fibers, cotton fibers, flax fibers, ramie fibers, jute fibers, wool fibers, silk fibers and a mixture of at least two of foregoing fibers.

3. A resin composition according to claim 2 in which said organic fiber is selected from the group consisting of aliphatic polyamide fibers, polyester fibers, cotton fibers, and a mixture of at least two of the foregoing fibers.

4. A resin composition according to claim 2 which additionally contains 5–50% by weight of an inorganic filler based on the resin composition.

5. A resin composition according to claim 4 in which said organic fiber is selected from the group consisting of aliphatic polyamide fibers, polyester fibers, cotton fibers, and a mixture of at least two of the foregoing fibers.

* * * * *